(12) United States Patent
Backa

(10) Patent No.: US 8,135,762 B2
(45) Date of Patent: Mar. 13, 2012

(54) SYSTEM AND METHOD FOR DETERMINING TRUE COMPUTER FILE TYPE IDENTITY

(75) Inventor: Bruce Backa, Incline Village, NV (US)

(73) Assignee: Bruce R. Backa, Incline Village, NV (US)

( * ) Notice: Subject to any disclaimer, the term of this patent is extended or adjusted under 35 U.S.C. 154(b) by 295 days.

(21) Appl. No.: 12/559,754

(22) Filed: Sep. 15, 2009

(65) Prior Publication Data

US 2010/0070543 A1 Mar. 18, 2010

Related U.S. Application Data

(60) Provisional application No. 61/096,986, filed on Sep. 15, 2008.

(51) Int. Cl.
*G06F 17/30* (2006.01)

(52) U.S. Cl. .................... 707/821; 707/828; 709/217

(58) Field of Classification Search .................. 707/821, 707/828, 812, 741, 758, 770, 747, 689, 698, 707/640; 709/217, 201; 726/28

See application file for complete search history.

(56) References Cited

U.S. PATENT DOCUMENTS

| | | | | |
|---|---|---|---|---|
| 5,978,791 | A * | 11/1999 | Farber et al. | 707/640 |
| 6,415,280 | B1 * | 7/2002 | Farber et al. | 707/698 |
| 6,928,442 | B2 * | 8/2005 | Farber et al. | 1/1 |
| 7,802,310 | B2 * | 9/2010 | Farber et al. | 726/28 |
| 7,945,539 | B2 * | 5/2011 | Farber et al. | 707/689 |
| 7,945,544 | B2 * | 5/2011 | Farber et al. | 707/698 |
| 7,949,662 | B2 * | 5/2011 | Farber et al. | 707/747 |
| 2002/0052884 | A1 * | 5/2002 | Farber et al. | 707/104.1 |
| 2004/0139097 | A1 * | 7/2004 | Farber et al. | 707/100 |
| 2005/0114296 | A1 * | 5/2005 | Farber et al. | 707/1 |
| 2005/0185636 | A1 | 8/2005 | Bucher | |
| 2007/0038637 | A1 | 2/2007 | Taneja et al. | |
| 2007/0150522 | A1 | 6/2007 | Stakutis et al. | |
| 2008/0016070 | A1 | 1/2008 | Ogawa et al. | |
| 2009/0037515 | A1 | 2/2009 | Zapata et al. | |

OTHER PUBLICATIONS

McDaniel, "An Algorithm for Content-Based Automated File Type Recognition," James Madison University Masters Thesis (online), Dec. 2001 [retrieved on Oct. 22, 2010], Retrieved from the Internet:< URL http://www.forensicswiki.org/images/f/f9/Mcdaniel01.pdf> entire document.

* cited by examiner

*Primary Examiner* — Jean M Corrielus
(74) *Attorney, Agent, or Firm* — Sampson & Associates, P.C.

(57) ABSTRACT

A system and method for providing a cost-effective, metadata independent mechanism for the determination of file types. When a user makes a request to store data, the storage device communicates with a storage management software function. The storage management software invokes a file determination system in order to determine the true file type of the file. The file determination system inspects the file header or raw data information and utilizes a structure or an algorithm that specifies, for various file types, the necessary data and patterns required in the file to be of this type, and determines the true file type. Thus storage management software can compare the true file type of a file being inspected to rules established by an administrator and subsequently inform the storage device to either accept or not accept the users request to store data.

7 Claims, 1 Drawing Sheet

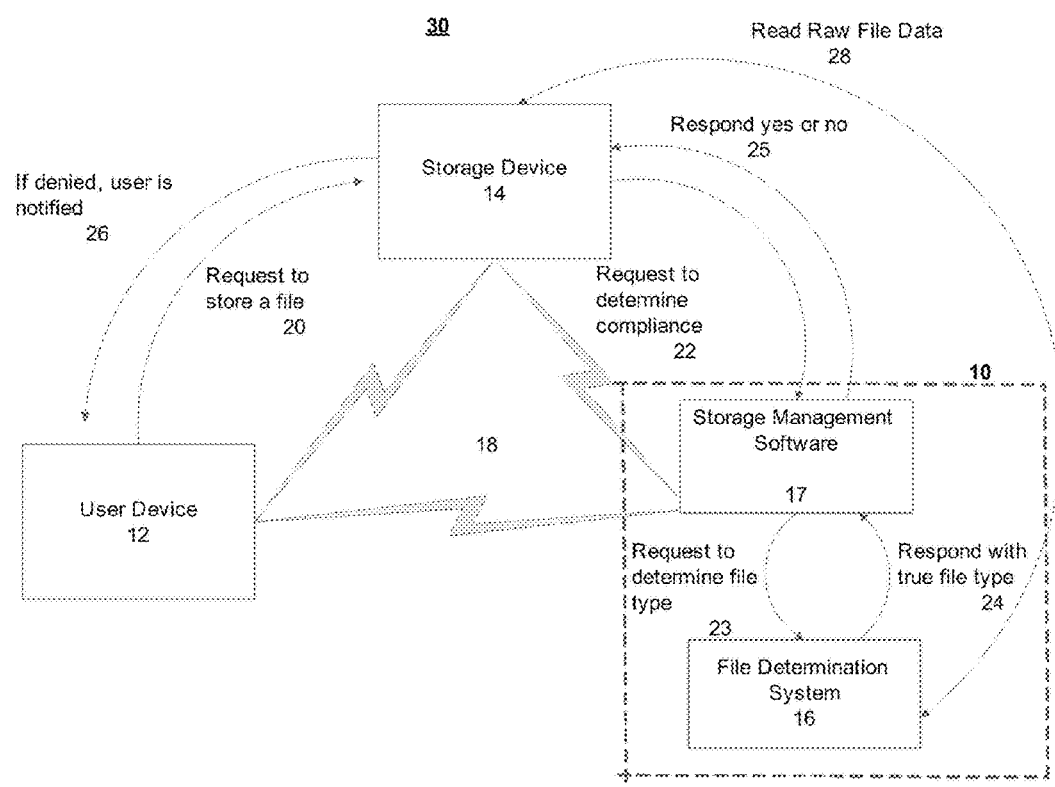

SYSTEM AND METHOD FOR DETERMINING TRUE COMPUTER FILE TYPE IDENTITY

TECHNICAL FIELD

The present invention relates to a cost-effective, metadata independent system and method for the determination of true computer file type identity.

BACKGROUND INFORMATION

It is important for companies to manage what data enters their storage environment to prevent illegal or unwanted files from being stored in potential violation of laws and/or company policy. Without executing such control, companies may be exposed to legal actions and run the risk that their corporate storage environments are quickly filled up with non-business related data such as videos, music files and the like which can consume large amounts of valuable storage.

Various software vendors provide tools that look at the file extension to determine the file type. However to truly determine what the type of a file is entering the environment, a mechanism is needed to determine the true file type that is not based on the file extension, which is alterable by the user. Many users will rename the extension of a non-sanctioned file type (e.g. ".mp3") to a sanctioned file type (e.g. ".doc") to avoid it being detected that they are storing prohibited files. Changing the file extension does not change the file characteristics.

Accordingly, what is needed is a cost-effective, metadata independent mechanism for the determination of true computer file types. This file determination mechanism can then be used as a component of storage management software and interact with a file blocking mechanism to prohibit unwanted files from being saved on the storage system being monitored and controlled.

SUMMARY

The invention contains the following components:
  A mechanism to select file types of interest (allows for configuration);
  A mechanism to recognize file types based on file header information (embedded within the data stream) for file types that have them (.exe, .doc, etc.);
  A structure or an algorithm that specifies for various other file types the necessary data and patterns required in the file for it to be of this type; and
  A mechanism to apply the above rules and determine the file's type.

The present invention features a system for determining whether a computer file to be stored on a data storage device is one of an allowed type of computer file allowed to be stored on the data storage device. The system comprises a data storage device, coupled to a plurality of user devices, for storing, at the request of one or more of said coupled plurality of user devices, computer data in the form of computer files. Each computer file requested to be stored being of one true computer file type. The data storage device is configured for receiving user requests for storing a computer file, wherein the user request for storing a computer file includes the computer file the user desires to store on the data storage device. The data storage device is responsive to the received request and accompanying computer file to be stored on the data storage device, for at least temporarily storing the computer file at a predetermined data storage device address and for issuing a request for permission to store data. The issued request for permission to store data includes the address on the data storage device at which the computer file to be stored on the data storage device can be accessed.

A true computer file type determination system is coupled to the data storage system. The true computer file type determination system includes a user interface responsive to user input, for receiving at least an indication one or more true computer file types allowed or prevented to be stored on said data storage device. The true computer file type determination system responsive to the received indication of one or more true computer file types allowed or prevented to be stored on said data storage device and to the request for permission to store data on the data storage device, for accessing the computer file to be stored on the data storage device and for examining at least a portion of the computer file, and for determining, from the examined at least a portion of the computer file to be stored on the data storage system, a true computer file type of the computer file to be stored on the data storage system. Based on the determination of true computer file type and to the received indication of one or more true computer file types allowed or prevented to be stored on the data storage device, determination system provides a positive or negative response to the data storage device to the issued request for permission to store data.

The present invention may also include a computer data storage management system. The computer data storage management system is coupled to said data storage device. The computer data storage management system may include a user interface, responsive to user input, for storing at least an indication one or more true computer file types allowed or prevented to be stored on the data storage device. The computer data storage management system is responsive to the request for permission to store data received from the data storage device, for issuing a request for determination of true computer file type for the received computer file to be stored on the data storage device. The request for determination of true computer file type includes the address on the data storage device at which the computer file to be stored on the data storage device can be accessed, and responsive to a received determination of true computer file type and to the received indication of one or more true computer file types allowed or prevented to be stored on the data storage device, for providing a positive or negative response to the data storage device to the issued request for permission to store data.

BRIEF DESCRIPTION OF THE DRAWINGS

These and other features and advantages of the present invention will be better understood by reading the following detailed description, taken together with the drawings wherein:

FIG. 1 is block diagram of a system implementing the file determination system and method of the present invention.

DETAILED DESCRIPTION OF THE PREFERRED EMBODIMENTS

The present invention utilizes a system 10, FIG. 1, including storage management software 17 (or its functionality) and a file determination system 16 for implementing the method for determining true computer file types according to the invention disclosed herein. The present invention will be explained in connection with a system 30 including one or more user devices 12, a storage device 14 (such as one or more disk drives or other data storage system). The user device 12, storage device 14, and a server on which resides the file determination system 16 and, if provided, storage management software 17, are coupled together over a local or wide area network by means of a network communication path 18. The user device 12 may be any form of computing or data processing device requiring access to data stored on the storage device 14. The file determination system 16 may be implemented in computer software as part of storage management computer software 17 located on a server that performs other functions and provides other features to the network.

An administrator would first configure the file determination system 16 for certain desired features such as to which file types should be inspected when a user tries to save a file to the storage environment (i.e. storage device 14). The administrator may also configure the file determination system 16 with one or more file types that the administrator wants the file determination system 16 to look for and prevent its storage to the storage environment. For example, the administrator may configure the file determination system 16 to look for and prevent storage of executable files. Therefore no matter what a file is labeled as, the file determination system will inspect the file and make a determination as to whether or not the file being inspected is of the type for which storage should be prevented. Other exclusionary type rules may also be developed and are within the scope of the invention. This is accomplished by a component mechanism of the file determination system 16 that allows administrators to select file types they want to control (include or exclude), and establish rules for each file type. When a user tries to save a file, the file determination system 16 is invoked and inspects the file, looking at file header information for those file types that have them or inspects the file data stream (raw data) for those files that do not have headers. A structure or an algorithm is utilized that specifies, for various file types, the necessary data and/or data patterns required in the file to be of that type. Thus the true computer file type is determined for the file being inspected irrespective of what it is named. This determination can then be provided to the storage management software 17 which can compare the true determined file type to allowed and/or prohibited file type rules established by the administrator in the storage management software 17 and enable it to direct a storage device 14 to block the file from being stored if applicable or allow it to be stored if allowable.

In accordance with one aspect of the present invention, the operating system of the storage device 14 is configured such that the storage management software 17 will be called or invoked whenever a user makes a request to store data which will be performed on the storage device 14. The storage management software 17 responds to the storage device 14 as to whether to allow the file to be stored. In another instance of the invention, the file determination system 16 does not involve storage management software 17 and instead performs the functions of the storage management software 17 described in this document that are necessary for the invention, in addition to the functions described for the file determination system 16 in this document. Thus, the file determination system 16 may be autonomous (include those necessary functions described with regards to the storage management system 17) and may interact directly with the data storage device 14.

Accordingly, when the user 12 issues a request 20 to store data, the storage device 14 temporarily stores the data at a certain address on the data storage device and invokes a call 22 to the storage management software 17. The invoked call 22 includes not only a request for review of the data storage request by the user but also includes the path and file name indicating where the data to be stored is at least temporarily contained. The storage management software 17 is a policy-based data storage management tool such as the NTP Software QFS software program suite. The storage management software 17 includes a user interface that allows administrators of the storage management software 17, such as a system manager, to establish rules that indicate what file types are allowed/not allowed to be stored on the system data storage device; what users are allowed/not allowed to store files on the data storage device; and perhaps even what users have restrictions to what file types they may store on the data storage device.

The storage management software 17 will review the request 22 issued by the storage device 14 that was initiated by the user request 20, and then invoke 23 the file determination system 16 to determine true file type. The request 23 to the file determination system 16 includes the path and file name to the data that a user wishes to store and for which the storage management system software 17 is invoking a request to determine a true computer file type.

The file type determination system 16 will determine the true file type of a file for the storage management software 17, by using the path and file name information received from the data storage system to access 28 the file data stream (raw data) for the applicable file on the storage device 14. The file type determination system 16 will read the raw data to determine file type. It has been previously determined and coded into the file determination system 16 what patterns of raw data equals what type of file (or what type of file will have a certain data stream pattern). Accordingly, a comparison of the raw data to be stored with the previously coded data types will yield what true type of file a user is attempting to store irrespective of what the file name or extension is.

The storage management system 17 will then compare the true file type received from the file determination system 16 to policies established for this user and for this file type and then provide a response 25 to the storage device 14 to dictate to the storage device 14 whether or not the storage device 14 should service (allow) the request of the user 20 to store this file. If the storage device cannot service the user request (blocks or denies the request for file storage), it will provide an indication 26 to the user 12 that such a request cannot be honored.

For example, user John Doe tries to save the file sample.doc on Data Storage System Alpha volume beta. Date Storage System Alpha communicates with the storage management software 17, in this example NTP QFS software, what storage action is being attempted, who it is being attempted by, and provides the path to sample.doc that was temporarily stored on Storage System Alpha. The storage management software 17 checks the rules previously established for John Doe by the system administrator. It finds that John Doe is not allowed to store exe (program) type files on Storage System Alpha. The storage management software 17 sends a request to the file determination system 16 to obtain the true computer file type of sample.doc. The file determination system 16 uses the file path information obtained from the storage device 14 to the storage management software 17 to read the raw data of sample.doc from the data storage device 14. By inspecting the raw data and comparing it to the known pattern of data for exe files, the file determination system 16 determines that sample.doc is in fact an exe type computer file. The file determination system 16 will then indicate to the storage management software 17 that sample.doc is an exe file. The storage management software 17 then indicates to Storage System Alpha not honor the request of John Doe to store sample.doc.

Accordingly, the present invention provides a novel system and method for determining true computer file type identity irrespective of the name or extension a user has given to a file. By inspecting raw data to be stored on the data storage device, the file type determination system of the present invention compares portions of the raw data to previously determined raw data patterns to arrive at a decision as to what true type of data file a user is attempting to store. Using this information, the storage management software can make a determination as to whether or not this user is allowed to store this type of data.

Modifications and substitutions by one of ordinary skill in the art are considered to be within the scope of the present invention, which is not to be limited except by the allowed claims and their legal equivalents.

The invention claimed is:

1. A system for determining whether a computer file to be stored on a data storage device is one of an allowed type of computer file allowed to be stored on the data storage device, the system comprising:

a data storage device, coupled to a plurality of user devices, for storing, at the request of one or more of said coupled plurality of user devices, computer data in the form of computer files, each computer file requested to be stored being of one true computer file type, said data storage device configured for receiving user requests for storing a computer file, said user request for storing a computer file including said computer file said user desires to store on said data storage device, said data storage device responsive to said received request and accompanying computer file to be stored on said data storage device, for at least temporarily storing said computer file at a predetermined data storage device address and for issuing a request for permission to store data, said issued request for permission to store data including said address on said data storage device at which said computer file to be stored on said data storage device is accessible;

a computer data storage management system, said computer data storage management system including a user interface, said computer data storage management system coupled to said data storage device and responsive to user input, for storing at least an indication one or more true computer file types allowed to be stored on said data storage device, and responsive to said request for permission to store data received from said data storage device, for issuing a request for determination of true computer file type for said received computer file to be stored on said data storage device, said request for determination of true computer file type including said address on said data storage device at which said computer file to be stored on said data storage device is accessible, and responsive to a received determination of true computer file type and to said stored indication one or more true computer file types allowed to be stored on said data storage device, for providing a positive or negative response to said data storage device to said issued request for permission to store data; and a true computer file type determination system, coupled to said data storage system and responsive to said request for determination of true computer file type for said received computer file to be stored on said data storage device received from said computer data storage management system, for accessing said computer file to be stored on said data storage device and for examining at least a portion of said computer file, and for determining, from said examined at least a portion of said computer file to be stored on said data storage system, a true computer file type of said computer file to be stored on said data storage system, and for providing said true computer file type to said computer data storage management system.

2. The system of claim 1, wherein said user interface of said computer data storage management system is responsive to user input for storing an indication of users having permission to store data on said data storage device.

3. The system of claim 2, wherein said indication of users having permission to store data on said data storage device further includes an indication of what true file type each user is selectively permitted and prevented from storing on said data storage device.

4. The system of claim 3, wherein said computer storage management system is responsive to said stored indication of what true file type a given user may store on said data storage device and to said received determination of true computer file type, for providing a positive or negative response to said data storage device to said issued request for permission to store data.

5. The system of claim 1, wherein said at least a portion of said computer file to be stored that is examined includes file header information.

6. A system for determining whether a computer file to be stored on a data storage device is one of an allowed type of computer file allowed to be stored on the data storage device, the system comprising:

a data storage device, coupled to a plurality of user devices, for storing, at the request of one or more of said coupled plurality of user devices, computer data in the form of computer files, each computer file requested to be stored being of one true computer file type, said data storage device configured for receiving user requests for storing a computer file, said user request for storing a computer file including said computer file said user desires to store on said data storage device, said data storage device responsive to said received request and accompanying computer file to be stored on said data storage device, for at least temporarily storing said computer file at a predetermined data storage device address and for issuing a request for permission to store data, said issued request for permission to store data including said address on said data storage device at which said computer file to be stored on said data storage device is accessible;

a computer data storage management system, said computer data storage management system including a user interface, said computer data storage management system coupled to said data storage device and responsive to user input, for storing at least an indication one or more true computer file types allowed to be stored on said data storage device, and for storing an indication of users having permission to store data on said data storage device, wherein said indication of users having permission to store data on said data storage device further includes an indication of what true computer file type each user may store on said data storage device, and responsive to said request for permission to store data received from said data storage device, for issuing a request for determination of true computer file type for said received computer file to be stored on said data storage device, said request for determination of true computer file type including said address on said data storage device at which said computer file to be stored on said data storage device is accessible, and responsive to said stored indication of what true computer file type a given user may store on said data storage and to a received determination of true computer file type, for providing a positive or negative response to said data storage device to said issued request for permission to store data; and a true computer file type determination system, coupled to said data storage system and responsive to said request for determination of true computer file type for said received computer file to be stored on said data storage device received from said computer data storage management system, for accessing said computer file to be stored on said data storage device and for examining at least a portion of said computer file, and for determining, from said examined at least a portion of said computer file to be stored on said data storage system, a true computer file type of said computer file to be stored on said data storage system, and for providing said true computer file type to said computer data storage management system.

7. A system for determining whether a computer file to be stored on a data storage device is one of an allowed type of computer file allowed to be stored on the data storage device, the system comprising:

a data storage device, coupled to a plurality of user devices, for storing, at the request of one or more of said coupled plurality of user devices, computer data in the form of computer files, each computer file requested to be stored being of one true computer file type, said data storage device configured for receiving user requests for storing a computer file, said user request for storing a computer file including said computer file said user desires to store on said data storage device, said data storage device responsive to said received request and accompanying computer file to be stored on said data storage device, for at least temporarily storing said computer file at a predetermined data storage device address and for issuing a request for permission to store data, said issued request for permission to store data including said address on said data storage device at which said computer file to be stored on said data storage device is accessible; and a true computer file type determination system, coupled to said data storage system, said true computer file type determination system includes a user interface responsive to user input, for receiving at least an indication of one or more true computer file types allowed or prevented to be stored on said data storage device, said true computer file type determination system responsive to said received indication of one or more true computer file types allowed or prevented to be stored on said data storage device and to said request for permission to store data on said data storage device, for accessing said computer file to be stored on said data storage device and for examining at least a portion of said computer file, and for determining, from said examined at least a portion of said computer file to be stored on said data storage system, a true computer file type of said computer file to be stored on said data storage system, and based on said determination of true computer file type and to said stored indication of one or more true computer file types allowed or prevented to be stored on said data storage device, for providing a positive or negative response to said data storage device to said issued request for permission to store data.

* * * * *